United States Patent [19]

Ishikawa

[11] Patent Number: 4,552,546
[45] Date of Patent: Nov. 12, 1985

[54] DEVICE FOR CONTROLLING THE TENSION OF A TRANSMISSION CHAIN IN AN EXTERNALLY MOUNTED SPEED CHANGER FOR A BICYCLE

[75] Inventor: Noritoki Ishikawa, Hiroshima, Japan
[73] Assignee: Ryobi Ltd., Hiroshima, Japan
[21] Appl. No.: 507,636
[22] Filed: Jun. 27, 1983
[30] Foreign Application Priority Data Jun. 25, 1982 [JP] Japan ............................. 57-110352

[51] Int. Cl.⁴ ........................ F16H 7/08; F16H 11/08
[52] U.S. Cl. ...................................... 474/82; 474/117
[58] Field of Search ............... 474/80, 81, 82, 115, 474/116, 117

[56] References Cited

U.S. PATENT DOCUMENTS

| 2,428,166 | 9/1947 | Letourneur | 474/80 |
| 2,431,513 | 11/1947 | Schwinn | 474/80 |
| 2,693,116 | 11/1954 | Juy | 474/80 |
| 2,839,939 | 6/1958 | Juy | 474/80 |
| 3,125,894 | 3/1964 | Juy | 474/80 |
| 4,403,978 | 9/1983 | Huret | 474/82 |
| 4,406,643 | 9/1983 | Shimano | 474/80 |

Primary Examiner—Stephen J. Novosad
Assistant Examiner—Bruce M. Kisliuk
Attorney, Agent, or Firm—Sughrue, Mion, Zinn, Macpeak, and Seas

[57] ABSTRACT

A speed changer for a bicycle includes a plurality of sprocket wheels provided on the hub of its rear wheel and having different diameters, a transmission chain, a movable member, a chain positioning frame supported rotatably on the movable member and carrying a guide pulley and a tension pulley for guiding the chain about one of the sprocket wheels while maintaining the chain under tension, and a spring having one end fastened to the movable member for urging the frame in the direction which enables the chain to be tensioned. The other end of the spring is engaged with a mechanism mounted for rotation relative to the frame and an adjustable coupling is provided between the mechanism and the frame to vary the spring force applied to the frame to thereby vary the spring tension applied to the chain.

4 Claims, 3 Drawing Figures

DEVICE FOR CONTROLLING THE TENSION OF A TRANSMISSION CHAIN IN AN EXTERNALLY MOUNTED SPEED CHANGER FOR A BICYCLE

BACKGROUND OF THE INVENTION

1. Field of the Invention

This invention relates to an externally mounted speed changer for a bicycle including a pantograph type mechanism by which the position of a transmission chain on a pluarlity of sprocket wheels on the hub of the rear wheel is changed from one sprocket wheel to another. More particularly, it is concerned with a device for controlling the tension of the transmission chain.

2. Description of the Prior Art

A typical speed changer for a bicycle comprises a sprocket wheel assembly 2 supported on a rear wheel hub 1, as shown in FIGS. 1 and 2. The sprocket wheel assembly 2 comprises a plurality of sprocket wheels 2a to 2f, each having a different number of teeth. A stationary member 4 has a bracket 3, and a pair of links 5 and 6 are rotatably connected at one end to the stationary member 4 by pins 7 and 8, respectively, while a movable member 9 is rotatably connected to the other ends of the links 5 and 6 by pins 10 and 11, respectively, whereby a pantograph mechanism A is defined. The pantograph mechanism A is secured to the hub 1 by the bracket 3. A guide pulley 13 is provided for guiding a transmission chain 12 about one of the sprocket wheels 2a to 2f, and a tension pulley 14 is provided for applying tension to the chain 12. The guide and tension pulleys 13 and 14 are rotatably supported by a chain positioning frame 15 which is rotatably mounted on the movable member 9. A torsion spring 16 is provided for urging the frame 15 in the direction which enables the chain 12 to be tensioned. A spring 17 is provided for urging the links 5 and 6 in the direction in which the frame 15 is urged outwardly or into vertical alignment with the sprocket wheel 2f of the smallest diameter. One end of an outer cable 18 is connected to the stationary member 4, while one end of an inner wire 19 is fastened to the movable member 9. If a speed changer operating lever provided on a handle or top tube, but not shown, is pulled, the links 5 and 6 are rotated inwardly against the force of the spring 17. This causes the inward displacement of the frame 15 toward the sprocket wheel 2a of the largest diameter, so that the chain 12 may be positioned about a selected sprocket wheel.

According to the arrangement hereinabove described, however, it is impossible to control the tension of the transmission chain 12, since the spring 16 is secured to the movable member 9 at one end, and to the frame 15 at the other end. It is difficult to choose a spring having a force which enables the driving of the chain and its positioning from one sprocket wheel to another to be achieved easily. Even if a spring having an appropriate force is employed, its fatigue results in a less strong tension which makes it easier for the chain to come off the sprocket wheel. This presents a great problem in the driving of the chain and the changing of the bicycle speed.

SUMMARY OF THE INVENTION

Under these circumstances, it is an object of this invention to provide a novel device for controlling the tension of a transmission chain in an externally mounted speed changer for a bicycle, and more particularly, a device which facilitates the stepless control for such tension without requiring any dismantling or spring changing.

According to this invention, a mechanism for controlling the spring force applied to a chain positioning frame carrying a guide pulley and a tension pulley for a a transmission chain is rotatably mounted on the movable chain shifting member and urged by a spring in the direction which enables the chain to be tensioned. One end of the spring is connected to the movable member, and the other end thereof is fastened to the spring force controlling mechanism. This mechanism facilitates the stepless control for the tension of the chain without requiring any dismantling. The selection of the spring no longer presents a critical problem. The fatigue of the spring can be compensated by appropriate adjustment, and the driving of the chain and the changing of the bicycle speed can be accomplished easily at any time.

The mechanism may comprise a cam and screw combination, a gear assembly, or any other simple mechanism that is inexpensive to construct.

DETAILED DESCRIPTION OF THE INVENTION

Figure 1:
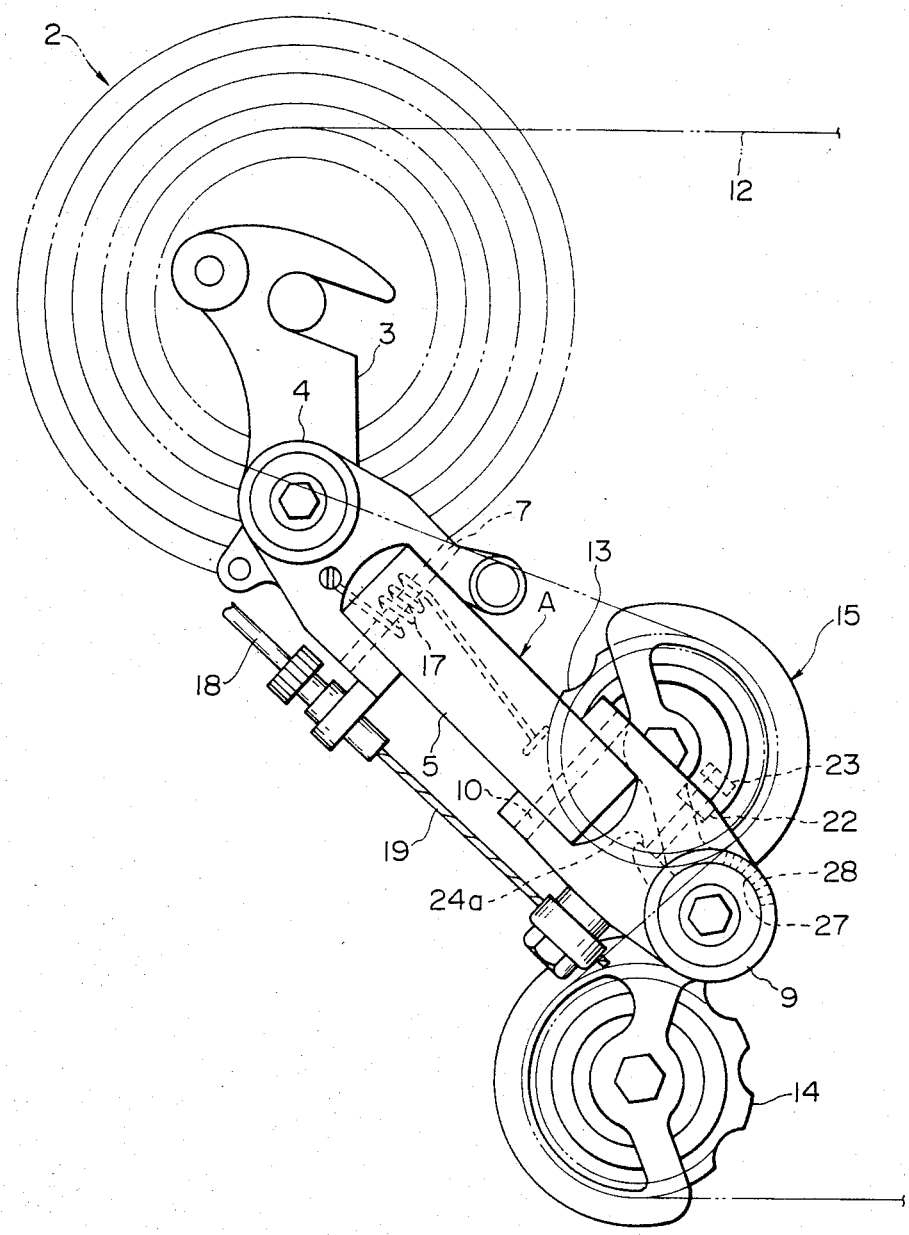
FIG. 1 is a front elevational view of an externally mounted speed changer for a bicycle including a chain tension device embodying this invention.
Figure 2:
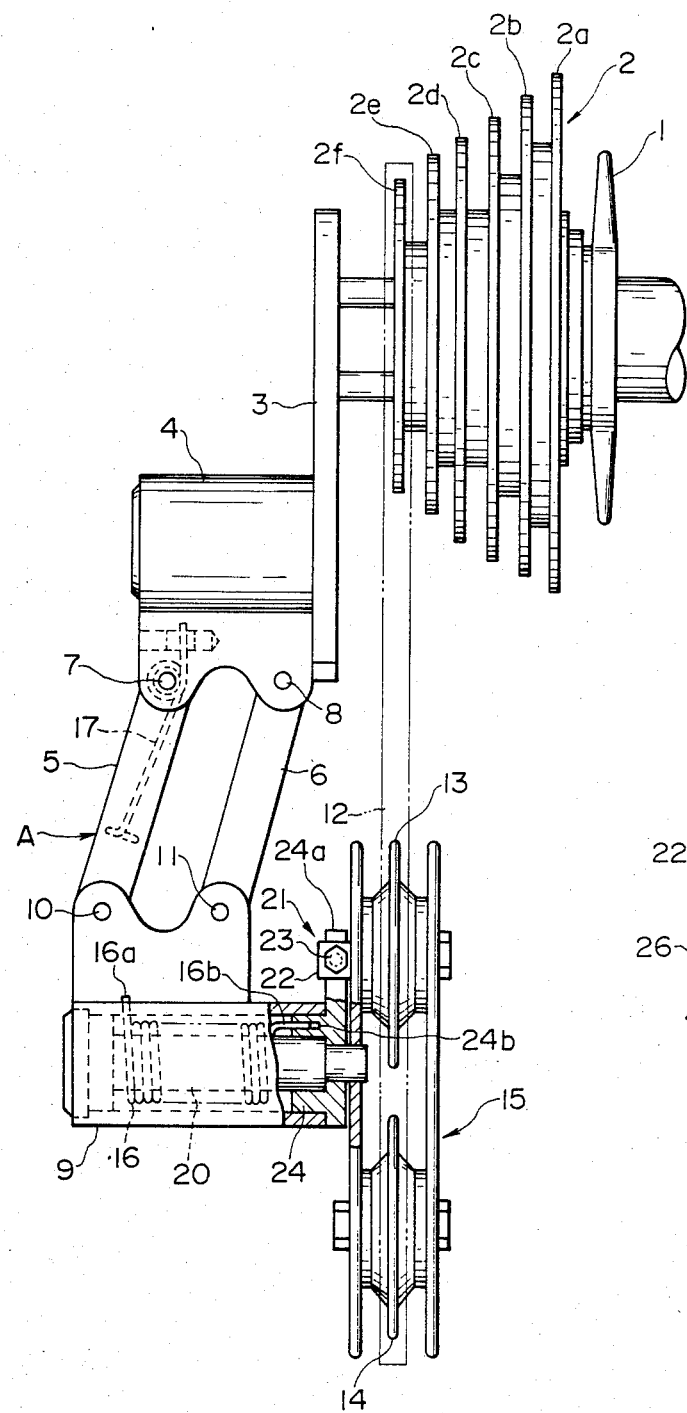
FIG. 2 is a top plan view of the speed changer and the tension control device shown in FIG. 1.

Referring to FIGS. 1 and 2 of the drawings, a mechanism 21 for controlling the spring force is provided for a chain positioning frame 15 which is rotatably supported on a shaft 20 extending through a movable member 9. A coil spring 16 surrounds the shaft 20 and has one end 16a fastened to the movable member 9, while the other end of the spring 16 is connected to the mechanism 21. The spring 16 urges the frame 15 in the direction which enables a transmission chain 12 to be tensioned. The mechanism 21 controls the force of the spring 16 on the frame 15 to thereby control the tension on the chain 12.

The mechanism 21 includes a bracket 22 projecting from one side of the frame 15 and having a threaded hole, an adjust screw 23 extending through the threaded hole of the bracket 22, and a cam 24 supported rotatably on the shaft 20 and having an inner end to which the other end 16b of the spring 16 is connected. The cam 24 has a portion 24a projecting outwardly from the movable member 9, and the screw 23 has an end abutting on the cam portion 24a. If the screw 23 is tightened or loosened, the cam 24 is forced to rotate in one direction against the force of the spring 16, or urged by the sping 16 to rotate in the opposite direction, whereby the force of the spring 16 is controlled so that the tension exerted on the frame 15 by the spring 16 may be varied. Alternatively, the screw 23 may be supported on the bracket 22 rotatably, but axially immovably, and the threaded end of the screw 23 may be threadedly engaged in a threaded hole provided in the portion 24a of the cam 24, but not shown.

Figure 3:
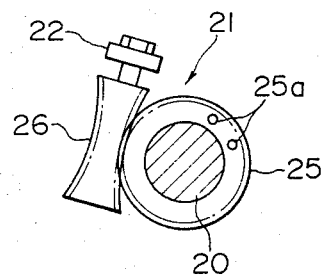
FIG. 3 is a front elevational view of another device embodying this invention.

A further arrangement embodying this invention is shown in FIG. 3. It includes a worm wheel 25 which is loosely fitted about the shaft 20 between the movable member 9 and the frame 15. The other end 16b of the spring 16 is selectively fastened to the worm wheel 25 in one of the holes 25a. A worm 26 is rotatably supported on the barcket 22, and engaged with the worm wheel 25 so that the force of the spring 16 may be varied if the worm 26 is rotated.

The mechanism 21 can also be realized by employing any other appropriate arrangement, for example, a spur gear assembly, not shown.

Referring again to FIGS. 1 and 2, a plurality of circumferentially spaced apart holes 24b are provided in the inner end of the cam 24 similar to holes 25a in the worm wheel of FIG. 3 so that the other end 16b of the spring 16 may be engaged in one of the holes 24b. Graduations 27 and 28 are provided between the outer periphery of the cam 24 and the outer periphery of the frame 15, or between the cam 24 and the movable member 9. A graduation, not shown, is proviced along the length of the adjust screw 23 for indicating the depth to which the screw 23 has been tightened. These graduations facilitate an inspection of the spring force set by the device of this invention to control the amount of tension on the chain 12.

What is claimed is:

1. In a speed changer for a bicycle provided on a bracket connected to a hub of its rear wheel, and including a plurality of sprocket wheels having different diameters, a transmission chain, a moveable member, a pair of parallel links pivotally connected at one end to said bracket and pivotally connected at the other end to said moveable member whereby said moveable member is supported for movement parallel to the axis of said hub, spring means on said bracket for biasing said moveable member in one axial direction a chain positioning frame supported rotatably on said moveable member and carrying a guide pulley and a tension pulley for guiding said chain about one of said sprocket wheels while maintaining said chain under tension, and a torsion spring provided on said moveable member for urging said frame in the direction which enables said chain to be tensioned, the improvement which comprises a stepless adjustable control mechanism provided on said frame for steplessly controlling the force of said torsion spring to control the tension on said chain, said torsion spring having one end engaged with said mechanism and the other end connected to said moveable member.

2. A speed changer as set forth in claim 1, wherein said mechanism comprises a shaft provided in said movable member, said frame being rotatably supported on said shaft, a bracket projecting from said frame and having a threaded hole, a cam rotatably fitted about said shaft and having an inner end with which said one end of said spring is engaged, and an outer end projecting radially outwardly from said cam, and an adjusting screw threadly engaged through said threaded hole and having an end abutting on said outer end of said cam.

3. A speed changer as set forth in claim 2, wherein said inner end of said cam is provided with a plurality of circumferentially spaced apart holes in which said one end of said spring is selectively engageable.

4. A speed changer as set forth in claim 1, wherein said mechanism comprises a shaft provided in said movable member, said frame being rotatably supported on said shaft, a bracket projecting from said frame, a worm wheel loosely fitted about said shaft, said one end of said spring being engaged with said worm wheel, and a worm supported rotatably on said bracket and engaged with said worm wheel.

* * * * *